(12) United States Patent
Ito et al.

(10) Patent No.: US 6,504,147 B1
(45) Date of Patent: Jan. 7, 2003

(54) MULTIBEAM SCANNER

(75) Inventors: Koji Ito, Gifu-ken (JP); Ryota Kato, Nagoya (JP); Yutaka Hattori, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 120 days.

(21) Appl. No.: 09/711,103

(22) Filed: Nov. 14, 2000

(30) Foreign Application Priority Data

Nov. 15, 1999 (JP) .......................................... 11-323478

(51) Int. Cl.⁷ ............................... H01J 3/14; B41J 2/47
(52) U.S. Cl. ....................... 250/234; 347/233; 358/494
(58) Field of Search ................................. 250/234–236; 347/232–234, 225; 358/483, 493, 494; 359/216, 217, 218, 219; 346/107.3–107.5

(56) References Cited

U.S. PATENT DOCUMENTS

| | | | |
|---|---|---|---|
| 4,393,387 A | | 7/1983 | Kitamura |
| 5,371,608 A | * | 12/1994 | Muto et al. .................. 358/474 |
| 5,750,986 A | * | 5/1998 | Genovese ................... 250/235 |
| 5,844,592 A | * | 12/1998 | Iizuka ......................... 347/239 |
| 6,185,026 B1 | * | 2/2001 | Hayashi et al. ............. 359/204 |

FOREIGN PATENT DOCUMENTS

JP            B2-4-3147        1/1992

* cited by examiner

Primary Examiner—Stephone B. Allen
(74) Attorney, Agent, or Firm—Oliff & Berridge, PLC

(57) ABSTRACT

In a multibeam scanner, the resolution switching circuit 91 of the control unit 9 transmits a control signal to the motor drive circuit 92 and controls the motor drive circuit 92 to rotate the drive motor 78 at a velocity corresponding to the resolution. The resolution switching circuit 91 transmits a resolution signal to the image generation circuit 93 and controls the image generated circuit 93 to generate output image data that conforms to the resolution. The LD1 control circuit 95 and the LD2 control circuit 96 are modulated by the modulation circuit 94 to oscillate the laser diodes LD1 and LD2 based on the output image data. When performing exposure at a low resolution, the rearmost scanning line SL2 in the previous group of lines and the forwardmost scanning line SL1 in the following group of scanning lines are exposed according to the same image signal, thereby preventing a loss of image quality by preventing open areas of the interval I2 between scanning lines from becoming noticeable.

7 Claims, 6 Drawing Sheets

MULTIBEAM SCANNER

BACKGROUND OF THE INVENTION

1. Field of the Invention

The present invention relates to a multibeam scanner.

2. Description of Related Art

Beam scanners used in laser beam printers and the like use a polygon mirror or the like to deflect an optical beam that is modulated according to image signals, thereby scanning a photosensitive material in a main scanning direction, while moving the photosensitive material in an auxiliary scanning direction to expose the photosensitive material to form an image thereon.

In recent years, a multibeam scanner has been proposed for performing main scans over a plurality of scanning lines simultaneously using a plurality of laser beams to irradiate the photosensitive material. By scanning a plurality of scanning lines in the main scanning direction simultaneously, this multibeam scanner can expose a photosensitive material in a shorter time than scanners using only one laser beam. Further, since the laser beams that scan the photosensitive material simultaneously are maintained at fixed intervals or distances in relation to one another, irregular intervals between beams is less likely to occur.

Sometimes it is desirable to print an image by altering its recording density in the auxiliary scanning direction. A measure for dealing with this case is described for a beam recorder proposed in Japanese Examined Patent Application Publication No. HEI-4-3147. In this method, the number of lit laser diodes is decreased in order to increase the interval between scanning lines that are scanned simultaneously.

SUMMARY OF THE INVENTION

Although it is possible to decrease the recording density for printing using this type of conventional beam recorder, the velocity in the auxiliary scanning direction is the same as when printing at a higher recording density. Accordingly, it is impossible to improve the printing speed even when reducing the resolution.

In view of the above-described drawbacks, it is an objective of the present invention to provide an improved multibeam scanner which is capable of printing faster in the auxiliary scanning direction when printing at a low resolution than when printing at a high resolution and which is still capable of exposing images at a high rate of speed with little loss in image quality.

In order to attain the above and other objects, the present invention provides a multibeam scanning device, comprising: a resolution setting unit setting at least a first resolution; a photosensitive medium moving unit moving a photosensitive medium in a predetermined moving direction, the photosensitive medium moving unit moving the photosensitive medium in the predetermined moving direction at a first velocity that corresponds to the first resolution, an auxiliary scanning direction being defined as a direction opposite to the predetermined moving direction; a light beam unit that emits a plurality of light beams; a light beam modulation unit that modulates the plurality of light beams dependently on image signals; and a beam deflecting unit deflecting the plurality of modulated light beams to simultaneously scan the plurality of light beams on a corresponding plurality of scanning lines that extend along a predetermined main scanning direction on the photosensitive medium, while the photosensitive medium moves in the predetermined moving direction, thereby exposing a corresponding image on the photosensitive medium, the main scanning direction being substantially orthogonal to the moving direction, the plurality of scanning lines being arranged adjacent to one another and being separated from one another by a first interval in the auxiliary scanning direction, the beam deflecting unit deflecting the plurality of light beams in the main scanning direction repeatedly to form a successive sets of plural scanning lines while the photosensitive medium moving unit moves the photosensitive medium in the predetermined moving direction, thereby forming the successive sets of scanning lines to be arranged and to be separated from one another by a second interval in the auxiliary scanning direction, the second interval having a value corresponding to the first velocity and greater than a value of the first interval, the plurality of light beams including a first light beam that forms, in each set, a first scanning line that is located adjacent to a scanning line in a preceding set of scanning lines, and a second light beam that forms, in each set, a second scanning line that is located adjacent to a scanning line in a subsequent set of scanning lines, the light beam modulation unit modulating, for the first resolution, the second light beam, that forms the second canning line of each set, and the first light beam, that forms the first scanning line of another set next to the each set, based on the same image signal.

The value of the second interval may preferably be in a range greater than the value of the first interval and smaller than a value second times as large as the value of the first interval.

The beam deflecting unit may deflect the plurality of modulated light beams to simultaneously scan the plurality of light beams at a predetermined main scan velocity along the predetermined main scanning direction on the photosensitive medium. The resolution setting unit may be capable of changing a resolution from the first resolution to another resolution. The photosensitive medium moving unit may change, in response to change of the resolution, the moving velocity of the photosensitive medium in the predetermined moving direction from the first velocity into another velocity, thereby changing the value of the second interval according to the set resolution.

The resolution setting unit may be capable of setting a second resolution that is greater than the first resolution. The photosensitive medium moving unit may move the photosensitive medium by a second velocity in the predetermined moving direction, the second velocity being smaller than the first velocity and allowing the value of the second interval to become equal to the first interval.

The multibeam scanning device may further comprise a light amount control unit that controls, when the resolution setting unit sets the first resolution, the light beam unit to set the light amounts of the first and second light beams to a first value, the light amount control unit controlling, when the resolution setting unit sets the second resolution, the light beam unit to set the light amounts of the first and second light beams to a second value, the first value being greater than the second value. A relationship between the first and second values of the light amounts corresponds to a relationship between the value of the second interval set for the first resolution and the value of the first interval.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENT

Figure 1:
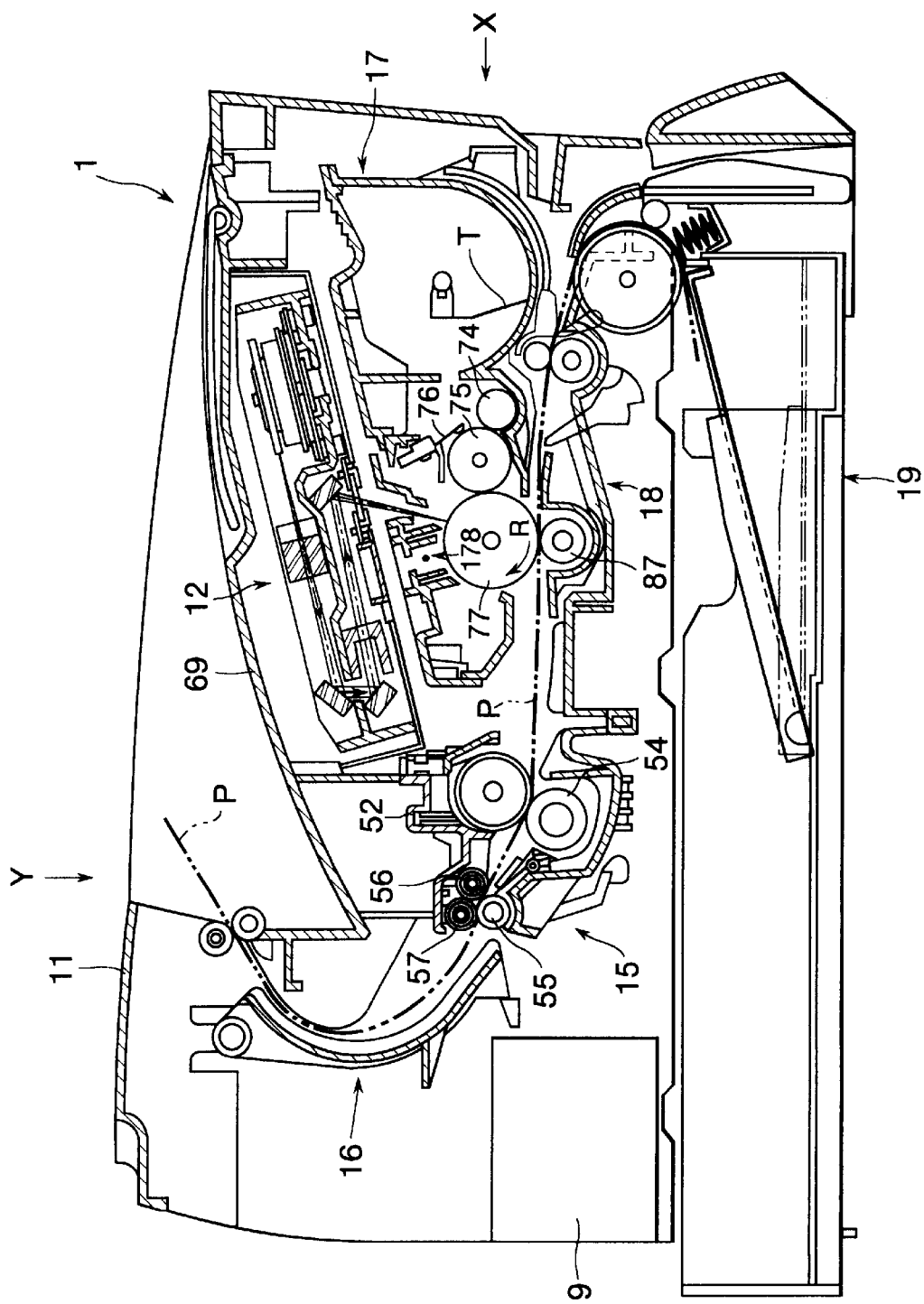
FIG. 1 is a side cross-sectional view of a laser printer, according to an embodiment of the present invention, from a direction orthogonal to the paper conveying direction.

A multibeam scanning device according to a preferred embodiment of the present invention will be described while referring to the accompanying drawings wherein like parts and components are designated by the same reference numerals to avoid duplicating description.

FIG. 1 shows a laser printer 1 which is provided with a multibeam scanner 12 according to the embodiment of the present invention. The multibeam scanner 12 of this embodiment is a laser scanner.

First, the overall structure of the laser printer 1 will be described with reference to FIG. 1.

As shown in FIG. 1, the laser printer 1 has a main frame 11. By this main frame, the overall shape of the laser printer 1 is formed approximately like a rectangular parallelepiped. In the drawing, the right side is the front of the laser printer 1, and the left side is the rear side of the laser printer 1.

A paper supply unit 19 is provided in the bottom of the main frame 11. The paper supply unit 19 includes a sheet feed cassette which stores and feeds sheets of papers P. One sheet of paper P is fed out from the paper supply unit 19 at a time of the front side of the laser printer 1. A conveying unit 18 is provided to convey the sheet of paper P from the front side of the laser printer 1 in a direction toward the rear side of the apparatus 1. A developing unit 17 is integrally formed as a processing unit, and is disposed on top of the conveying unit 18. The multibeam scanner 12 of the present embodiment is disposed on top of the developing unit 17.

The developing unit 17 includes a photosensitive drum 77, an electric charger 178, a developing roller 75, and a transfer roller 87. The electric charger 178 is for electrically charging the surface of the photosensitive drum 77 uniformly. In this example, the electric charger 178 is a scorotron charger. The multibeam scanner 12 serves to modulate two laser beams LB1 and LB2 (FIG. 2) according to image signals and to radiate the modulated two laser beams onto the photosensitive drum 77, thereby scanning the photosensitive drum 77 to form a corresponding latent image. The developing roller 75 is for conveying toner T for developing the latent image on the photosensitive drum 77. The transfer roller 87 is for transferring the developed toner image onto the paper P which is being conveyed by the conveying unit 18.

A fixing unit 15 is disposed downstream side of the developing unit 17 in the sheet conveying direction. The conveying unit 18 further conveys the paper P to the fixing unit 15 after the toner image has been transferred onto the sheet of paper P. The fixing unit 15 is integrally configured as one unit for providing heat and pressure to the paper P to fix the toner T onto the same.

A discharge unit 16 is provided to discharge the paper P, that has been subjected to the fixing process, onto a paper supporting unit 69 that is provided on top of the laser printer 1. The discharge unit 16 is capable of switching the direction of discharge.

A control unit 9 is further provided in the laser printer 1 that controls the entire apparatus 1 and that also controls the laser scanner 12 of the present embodiment.

Each element in the laser printer 1 will be described below in greater detail.

In the developing unit 17, the photosensitive drum 77 is mounted rotatable about its axis in a predetermined rotating direction R indicated by an arrow in the drawing. The electric charger 178 is disposed above the photosensitive drum 77. The developing roller 75 is disposed on the front side of the photosensitive drum 77. The developing roller 75 is located in contact with the photosensitive drum 77 and rotating in a direction opposite to that of the photosensitive drum 77.

A supply roller 74 is provided on the front side of the developing roller 75. The supply roller 74 rotates in the same direction as the developing roller 75. The supply roller 74 is contacting the developing roller 75 with pressure. The supply roller 74 has a sponge surface (not shown) that deposits fine granules of toner T onto the developing roller 75.

A layer thickness regulating blade 76 is provided in contact with the developing roller 75 with a prescribed pressure to regulate the amount of toner T deposited on the developing roller 75 at a proper and uniform level, scraping off excessive amounts of toner T.

According to the present embodiment, the electric charger 178 is a scorotron charger. More specifically, the electric charger 178 includes a charging wire. The charging wire is formed of a tungsten wire, known as a corona wire, having a diameter in the range of 50–100 $\mu$m. The charging wire is deposed parallel to and separated approximately 10 mm from the photosensitive drum 77. The electric charger 178 further includes a shield electrode surrounding the charging wire. The shield electrode is made of aluminum and is formed with a slit opening at a location opposing the photosensitive drum 77. The slit opening extends approximately parallel to the rotational axis of the photosensitive drum 77. A grid electrode is provided over the slit opening. The grid electrode is made of several wires or a mesh, and is electrically insulated from the shield electrode.

The charging wire is electrically connected to a terminal, of a positive polarity, on a power source (not shown). The charging wire is supplied with a high voltage in the range of 5–10 kV from the power source. As a result, ions in positive polarity are generated from the charging wire, and migrate to the surface of the photosensitive drum 77 to electrically charge the same. The grid electrode is supplied with a bias voltage to regulate the charge potential of the photosensitive drum 77. The charge can be controlled by varying the voltage of the charging wire. Hence, the electric charger 178 applies a positive charge to the surface of the photosensitive drum 77.

It is noted that the electric charger 178 can be of a scorotron type that has no grid electrode. The electric charger 178 may be constructed from other types of electric charger that generate corona discharge to electrically charge the photosensitive drum 77. For example, the charger 178 may be constructed from a brush-type charger.

Figure 2:
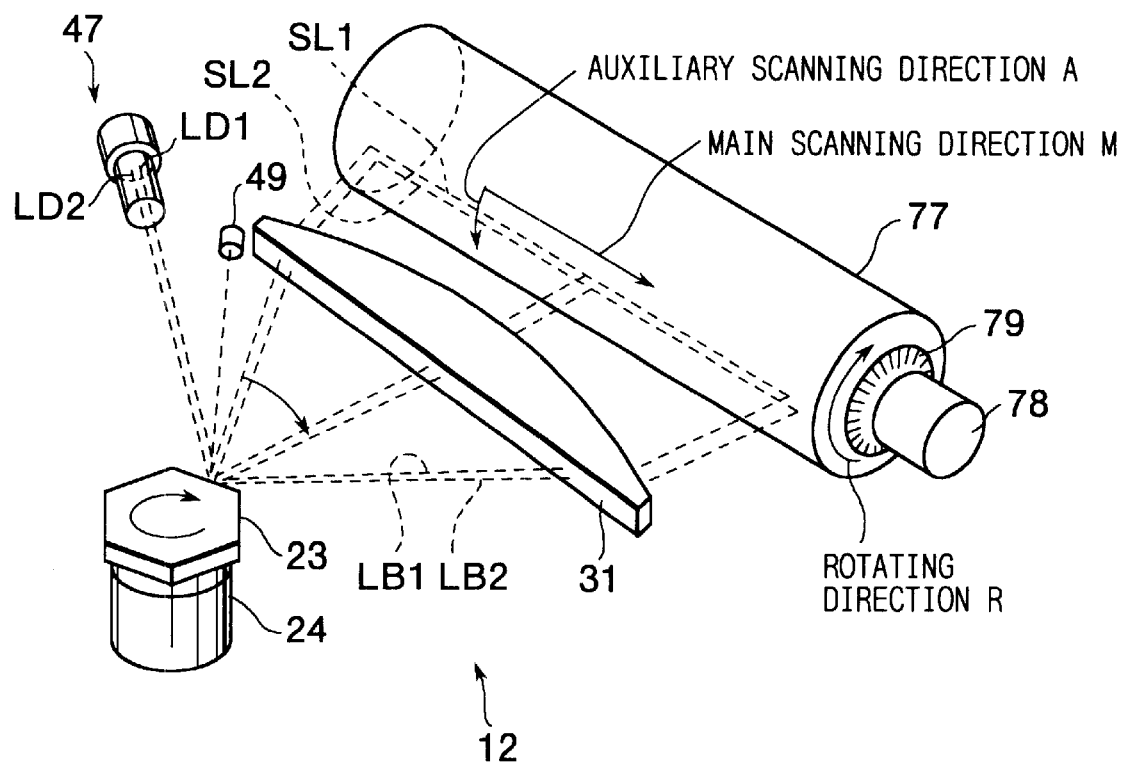
FIG. 2 is an explanatory diagram showing the general construction of a laser scanner provided in the laser printer of FIG. 1.

The electrically-charged areas on the surface of the photosensitive drum 77 moves along with the rotation of the photosensitive drum 77. As shown in FIG. 2. The photosensitive drum 77 rotates in the predetermined rotation direction R indicated by the arrow in the drawing. A direction opposite to this rotating direction R will be referred to as an auxiliary scanning direction A hereinafter. Thus, the electrically-charged areas of the photosensitive drum 77 move in the predetermined rotating direction R, while the laser beams LB1 and LB2 from the laser scanner 12 move in a main scanning direction M to irradiate the charged areas. The main scanning direction M is approximately orthogonal or perpendicular to the predetermined rotating direction R, that is, to the auxiliary scanning direction A.

It is noted that the entire processing unit 17 is changed with a new one when toner T is used up. The photosensitive drum 77 is therefore changed with a new one together with the processing unit 17. According to the present embodiment, therefore, the photosensitive material provided on the outer surface of the photosensitive drum 77 can be made from an organic photoconductor (OPC) even though the organic photoconductor has relatively low durability. Because the photosensitive material on the photosensitive drum 77 is made from the organic photoconductor, the photosensitive drum 77 can be made lightweight and relatively inexpensive.

When the laser beams LB1 and LB2 radiate on the surface of the photosensitive drum 77, the conductivity on the surface increases, and the electrically-charged potential drops. As a result, latent images are formed on the photosensitive drum 77 due to the difference generated in the electric potential.

It is noted that the photosensitive material of the photosensitive drum 77 may be made from other material, such as amorphous silicon aSi which has durable photoconductivity and which is capable of being exposed at a high rate of speed. The photosensitive material may also be made from a selenium type photosensitive material, such as selenium or a selenium alloy. The photosensitive material may be made from cadmium sulfide or the like.

As shown in FIG. 1, as the photosensitive drum 77 rotates, the surface area, on which a latent image is formed, contacts the developing roller 75. The surface of the developing roller 75 is deposited with toner T. The developing roller 75 is a rubber roller having a stainless steel shaft surrounded with a silicone rubber or urethane rubber dispersed with carbon black for conductivity. The surface of the roller is located with a fluorine containing resin. The toner T deposited on the developing roller 75 is therefore frictionally charged into a positive polarity by the supply roller 74 and also by the layer thickness regulating blade 76.

When the developing roller 75 contacts the photosensitive drum 77, the toner T deposits on the area on the photosensitive drum 77 that has a lower charged voltage due to being irradiated by the laser beams LB1 and LB2. As a result, the toner T develops the latent image into a visible toner, completing the developing process. Simultaneously, residual toner T on the photosensitive drum 77 is recovered by the developing roller 75. With further rotation of the photosensitive drum 77, the toner image is conveyed to a position opposing the paper P at the nip portion between the photosensitive drum 77 and the transfer roller 87.

The transfer roller 87 is a conductive roller that is covered with a silicon or urethane rubber surface dispersed with carbon black for conductivity. The transfer roller 87 is connected to a terminal, of a negative polarity, on a power source (not shown). Thus, the transfer roller 87 applies a negative polarity voltage to the paper P. The transfer roller 87 is urged toward the photosensitive drum 77, forcing the paper P to contact the photosensitive drum 77. As a result, the toner image is transferred from the photosensitive drum 77 onto the paper P.

After the toner image is transferred to the paper P, the paper P is further conveyed by the conveying unit 18 to the fixing unit 15. The fixing unit 15 includes a pressure roller 54 and a heat roller 52. The pressure roller 54 urges the paper P toward the heat roller 52, forcing the toner image on the paper P to contact the heat roller 52. The surface of the heat roller 52 is heated to a high temperature, causing the toner T to melt and permeate into the fiber of the paper P.

A first discharge roller 55 and first and second follower rollers 56 and 57 are provided downstream from the heat roller 52 in the paper conveying direction. The first discharge roller 55 is driven by a drive mechanism (not shown). The first and second follower rollers 56 and 57 move in association with the first discharge roller 55. The first discharge roller 55 and the first and second follower rollers 56 and 57 cooperate to discharge the paper P from the fixing unit 15 via the discharge unit 16 onto the paper supporting unit 69.

Next, the laser scanner 12 will be described in greater detail with reference to FIG. 2.

As shown in FIG. 2, the laser scanner 12 includes an exposure unit 47, a collimator lens (not shown), a cylindrical lens (not shown), a polygon mirror 23, and an fθ lens 31. The exposure unit 47 includes two laser diodes LD1 and LD2 (hereinafter also referred to collectively as laser diodes LD when not distinguishing between the two). In the exposure unit 47, the two laser diodes LD1 and LD2 are provided as being separated from each other by a predetermined distance. The laser diodes LD1 and LD2 emit laser beams LB1 and LB2 (hereinafter also referred to collectively as laser beams LB when not distinguishing between the two) that are modulated based on corresponding image signals. The laser beams LB1 and LB2 are projected onto the polygon mirror 23 via the collimator lens and the cylindrical lens (not shown). The polygon mirror 23 is driven by a drive motor 24 to rotate at a high speed in the direction indicated by the arrow in the drawing. The polygon mirror 23 deflects the laser beams LB1 and LB2 to move at a constant angular velocity. After passing through the fθ lens 31, the laser beams moves at a constant linear velocity. Accordingly, the laser beams LB1 and LB2 move approximately simultaneously in the main scanning direction M, shown by the arrow, at the same fixed speed, to expose two adjacent scanning lines SL1 and SL2 (hereinafter also referred to collectively as scanning lines SL when not distinguishing between the two) on the photosensitive drum 77.

A beam detector 49 is provided for detecting the laser beam LB1 just prior to when the laser beam LB1 starts scanning the photosensitive drum 77. Upon detecting the laser beam LB1, the beam detector 49 transmits a scan start signal to the control unit 9. The scan start signal indicates the timing at which each of successive series of main scanning operation starts.

The photosensitive drum 77 is driven by a photosensitive drum drive motor (stepping motor) 78 (actuator) to rotate in the predetermined rotation direction R indicated by the arrow on the side of the drum in the drawing. The control unit 9 serves to drive the stepping motor 78 to rotate the photosensitive drum 77 at a timing that is synchronized with the timing of the main scan indicated by the scan start signal. The rotation of the photosensitive drum 77 moves the photosensitive material, provided on the surface of the photosensitive drum 77, to be exposed to the laser beams LB in the drum moving direction R. Thus, the laser beams LB gradually irradiate the entire photosensitive material in the auxiliary scanning direction A, that is defined as opposite to the drum rotating direction R, to form an entire latent image.

An optical rotary encoder 79 is provided to the photosensitive drum 77 to detect the rotations of the photosensitive drum 77. The optical rotary encoder 79 electrically converts the detected rotations of the photosensitive drum 77, and provides feedback to the control unit 9 for control. Although not shown in the drawing, the rotary encoder 79 includes a disk-shaped member and a light sensor. The disk-shaped member is formed with a plurality of slits at a prescribed angular interval. The light sensor is constructed from a light-emitting element and a light-receiving element. The disk-shaped member is provided so as to rotate together with the photosensitive drum 77. The light-emitting element and the light-receiving element are provided as being fixed to the wall of the processing unit 17 and so that the disk-shaped member is interposed between the light-emitting element and the light-receiving element. The light-receiving element detects light beams that have emitted from the light-emitting element and that have passed through the slits in the rotating disk-shaped member. The light-receiving element thus obtains data of velocity of the photosensitive drum 77, and converts the velocity data to electric signals in pulse form. The light-receiving element supplies the electric signals to the control unit 9.

Figure 3:
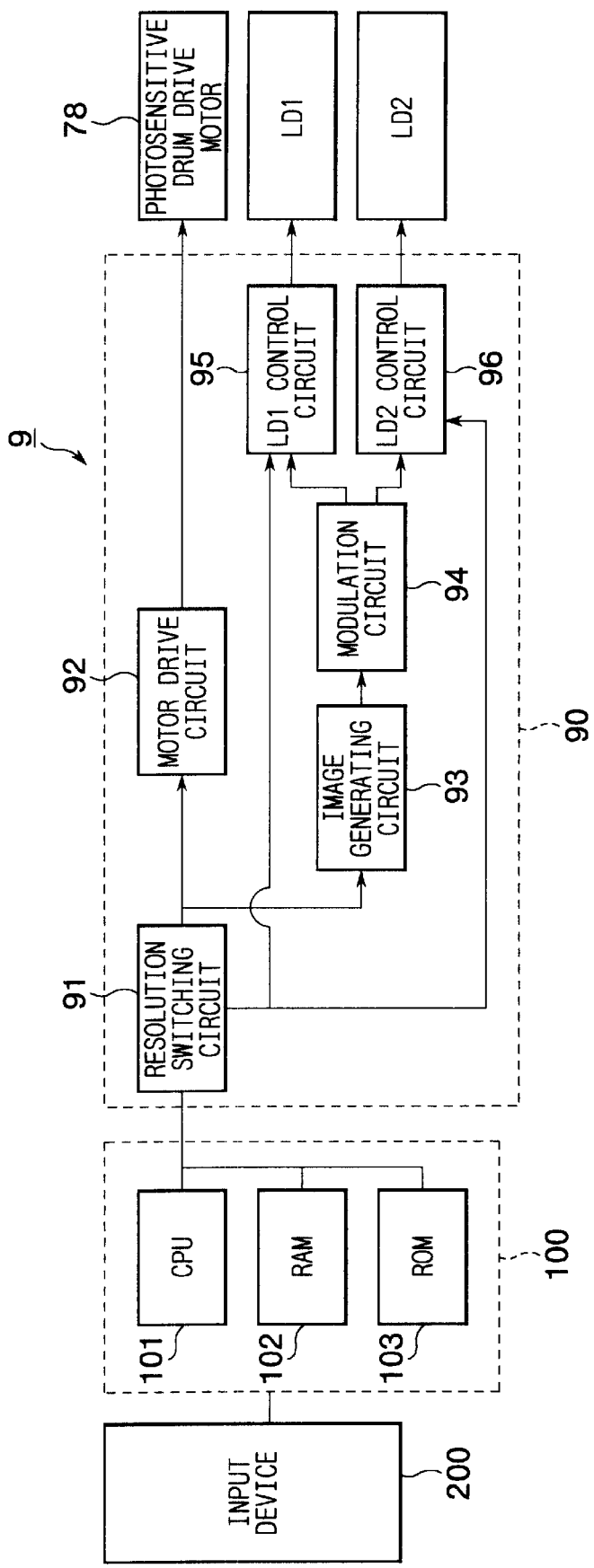
FIG. 3 is a block diagram showing a control unit for controlling a resolution of the laser scanner of FIG. 2.

Next, the control unit 9 will be described with reference to FIG. 3.

According to the present embodiment, the control unit 9 serves to control the entire laser printer 1 and also to set a resolution mode. As shown in FIG. 3, the control unit 9 includes a hardware circuit portion 90 and a computer portion 100. The hardware circuit portion 90 includes: a resolution switching circuit 91, a motor drive circuit 92, an image generating circuit 93, a modulation circuit 94, an LD1 control circuit 95, and an LD2 control circuit 96. The motor drive circuit 92 is connected to the photosensitive drum drive motor 78. Those circuits (1–94 are constructed from electronic circuits. The computer portion 100 includes a CPU 101, a RAM 102, and a ROM 103.

It is noted that the functions of the electronic circuits 91–96 could be executed by a software process, that is, by the CPU 101 executing control programs stored in the ROM 103. In this case, the electronic hardware circuits 91–96 are not needed.

It is noted that the laser scanner 1 of the present embodiment can operate in both of a high resolution mode to print images at a high resolution, and a low resolution mode to print images at a lower resolution. During the high resolution mode, images are printed at a high resolution D of 1,200 dpi (dots per inch), for example. During the low resolution mode, images are printed at a low resolution D' of 400 dpi, for example.

The control unit 9 is connected to an input device 200 (input/output interface), which is electrically connected to an external computer (not shown). The control unit 9 receives image data and a resolution selection signal from the input device 200. The image data is representative of an image which a user desires to print by the laser printer 1. The resolution selection signal is indicative of a desired resolution, at which the image data is desired to be printed. When image data and a resolution selection signal are inputted from the input device 200 to the control unit 9, the CPU 101 stores the image data in the RAM 102 or other storage device (not shown). The CPU 101 supplies the resolution selection signal to the resolution switching circuit 91.

The resolution switching circuit 91 is for receiving the resolution selection signal and for selecting, according to the resolution selection signal, the user's desired mode among the high resolution mode and the low resolution mode. The resolution switching circuit 91 produces a control signal with its period corresponding to the user's selected resolution. The resolution switching circuit 91 outputs the control signal both to the motor drive circuit 92 and to the image generation circuit 93.

The motor drive circuit 92 is for receiving the control signal and for producing a drive signal in the form of a periodic pulse voltage with its pulse number or pulse period corresponding to the period of the control signal. Accordingly, the pulse number of the drive signal indicates the user's selected resolution. The motor drive circuit 92 outputs the drive signal to the photosensitive drum drive motor 78.

The photosensitive drum drive motor 78, configured from a stepping motor, is driven by the drive signal to rotate the photosensitive drum 77 at a velocity that corresponds to the pulse number of the drive signal. More specifically, when the drive signal has the pulse number corresponding to the high resolution, the drive signal drives the photosensitive drum drive motor 78 to rotate the photosensitive drum 77 at a low velocity V. When the drive signal has the pulse number corresponding to the low resolution, the drive signal drives the photosensitive drum drive motor 78 to rotate the photosensitive drum 77 at a high velocity V'.

It is noted that the low velocity V and the high velocity V' have the following relationship:

$$V'=V \times (D2D')$$

where D is the resolution value at the high resolution mode, while D' is the resolution value at the low resolution mode. When D=1,200 dpi and D'=400 dpi, the velocity values V' and V have the following relationship:

$$V'=V \times (3/2).$$

In this way, the photosensitive drum 77 is rotated at a selected one of the two revolution speeds V and V', to thereby perform an auxiliary scan with a scanning speed appropriate for the selected resolution and convey the printing paper at the selected velocity. It is noted that the main scanning speed by the laser beams LB is fixed to an amount that is determined dependently on the rotational speed of the polygon mirror 23. The rotational speed of the polygon mirror 23, that is, the rotational speed of the polygon mirror drive motor 24 is fixed to the same single speed both during the high resolution mode and the low resolution mode. Accordingly, the main scanning speed is fixed to the same predetermined value both during the high resolution mode and during the low resolution mode.

The image generation circuit 93 is for receiving the image data, which is temporarily sorted in the RAM 102 or other storage device. The image generation circuit 93 is also for receiving the control signal form the resolution switching circuit 91. The image generation circuit 93 is for developing the received image data into output image data, in the form of a dot matrix, according to the selected resolution. In the dot matrix, dot rows and dot columns are arranged, with the number of the dot rows and the number of the dot columns corresponding to the selected resolution. Thus, the output image data represents a dot image with its average dot density (recording density) corresponding to the selected resolution. In the case where resolution D for high resolution is 1,200 dpi, and the resolution D' for low resolution is 400 dpi, the number of dot rows in the dot matrix for high resolution is three times as large as that for low resolution. The number of dot columns in the dot matrix for high resolution is also three times as large as that for low resolution.

The image generating circuit 93 groups the thus produced output image data into successive lines' worth of output image data, which are indicative of successive dot rows. The successive lines' worth of output image data is used, during successively-performed scanning operation, in a manner that the image generating circuit 93 successively selects two adjacent lines' worth of output image data and outputs them to the modulation circuit 94. The two adjacent lines' worth of output image data are indicative of two adjacent dot rows. During each scanning operation, the image generation circuit 93 selected one line's worth of image data, and outputs the selected data as first output image data to be used by the laser diode LD1. The image generation circuit 93 selects the next line's worth of image data and outputs the selected data as second output image data to be used by the laser diode LD2.

More specifically, during the high resolution mode, the image generating circuit 93 produces successive lines' worth of output image data (dot matrix data) in the high dot-density D. During some scanning operation, the image generating circuit 93 selects n-th line's worth of output image data as first output image data, and selects the (n+1)-th line's worth of output image data as second output image data. During the next scan, the image generating circuit 93 will select the (n+2)-th line's worth of output image data as first output image data and select the (n+3)-th line's worth of output image data as second output image data. Thus, during the high resolution mode, the image generating circuit 93 selects one line's worth of output image data as second output image data for each scan, and selects the next line's worth of output image data as first image data for the next scan.

On the other hand, during the low resolution mode, the image generating circuit 93 produces successive lines' worth of output image data (dot matrix data) in the low dot-density D'. During some scanning operation, the image generating circuit 93 selects n-th line's worth of output image data as first output image data, and selects (n+1)-th line's worth of output image data as second output image data. During the next scan, the image generating circuit 93 will select the (n+1)-th line's worth of output image data as first output image data, and select (n+2)-th line's worth of output image data as second output image data. Thus, during the low resolution mode, the image generating circuit 93 selects one line's worth of output image data as second output image data for each scan, and selects the same line's worth of output image data as first image data for the next scan.

Thus, a scanning line, which is formed by the laser diode LD2 during some scanning operation, and the next scanning line, which is formed by the laser diode LD1 during the next scanning operation, will be formed by the same output image data. Accordingly, the interval (which will be referred to as "interval I2" later) between the thus produced two scanning lines will not appear noticeable.

The modulation circuit 94 is for receiving the first and second output image data from the image generating circuit 93. Based on the first output image data, the modulation circuit 94 generates a first modulation signal and transmits the first modulation signal to the LD1 control circuit 95. Based on the second output image data, the modulation circuit 94 generates a second modulation signal and transmits the second modulation signal to the LD2 control circuit 96.

During the high resolution mode, the first and second output image data has a high average dot density. However, the main scanning speed by the polygon mirror 24 is fixed to the predetermined value. Accordingly, based on the first and second output image data, the modulation circuit 94 produces first and second modulation signals so that the first and second modulation signals will have a high frequency. The high frequency modulation signals will produce dot images with the high average dot density, along the main scanning direction M, even through the main scanning speed is fixed to the predetermined value.

On the other hand, during the low resolution mode, the first and second output image data has a low average dot density. The main scanning speed by the polygon mirror 23 is fixed to the predetermined value. Accordingly, based on the first and second output image data, the modulation circuit 94 produces first and second modulation signals so that the first and second modulation signals will have a low frequency. The low frequency modulation signals will produce dot images with the low average dot density, along the main scanning direction M, even through the main scanning speed is fixed to the predetermined value.

The LD1 control circuit 95 is for receiving the first modulation signal and for producing a first drive signal based on the first modulation signal. The LD1 control circuit 95 applies the first drive signal to the laser diode LD1. The LD2 control circuit 96 is for receiving the second modulation signal and for producing a second drive signal based on the second modulation signal. The LD2 control circuit 96 applies the second drive signal to the laser diode LD2.

During the high resolution mode, the LD1 control circuit 95 and the LD2 control circuit 96 are controlled by the resolution switching circuit 91 to prepare the amplitude or voltage value of the first and second drive signals to a predetermined reference value. ON the other hand, during the low resolution mode, the LD1 control circuit 95 and the LD2 control circuit 96 are controlled by the resolution switching circuit 91 to prepare the amplitude or voltage value of the first and second drive signals to another value that is greater than the reference value.

The laser diode LD1 is turned on and off according to the first drive signal. The laser diode LD2 is turned on and off according to the second drive signal. The intensities or light amounts of the laser diodes LD1 and LD2 correspond to the voltage amounts of the first and second drive signals. Accordingly, during the high resolution mode, the laser diodes LD1 and LD2 emit laser beams LB1 and LB2 with an intensity of a predetermined reference value. During the low resolution mode, the laser diode LD1 and LD2 emit laser beams LB1 and LB2 with an intensity of a greater value. Because the laser beams LB have a greater intensity during the low resolution mode than during the high resolution mode, it is possible to prevent a drop in image density (tone) of the area with the interval I2.

Thus, during the low resolution mode, it is necessary to decrease the average dot density both in the main scanning direction M and in the auxiliary scanning direction A. Accordingly, the input image data is developed into a dot matrix (output image data) with a lower average dot density both in the main scanning direction M and in the auxiliary scanning direction A. The frequency of the modulation signal for modulating the laser diodes LD is decreased in correspondence with the average dot density of the output image data along the main scanning direction. Accordingly, even when the main scanning velocity remains as being fixed to the same value as in the high resolution mode, the resultant image can have a decreased average dot density along the main scanning direction M. Along the auxiliary scanning direction A, the dot matrix (output image data) has a decreased average dot density in the auxiliary scanning direction A, and also the auxiliary scanning velocity is increased from the value V to the value V'. Accordingly, the resultant image can have a decreased average dot density also along the auxiliary scanning direction A.

Figure 5:
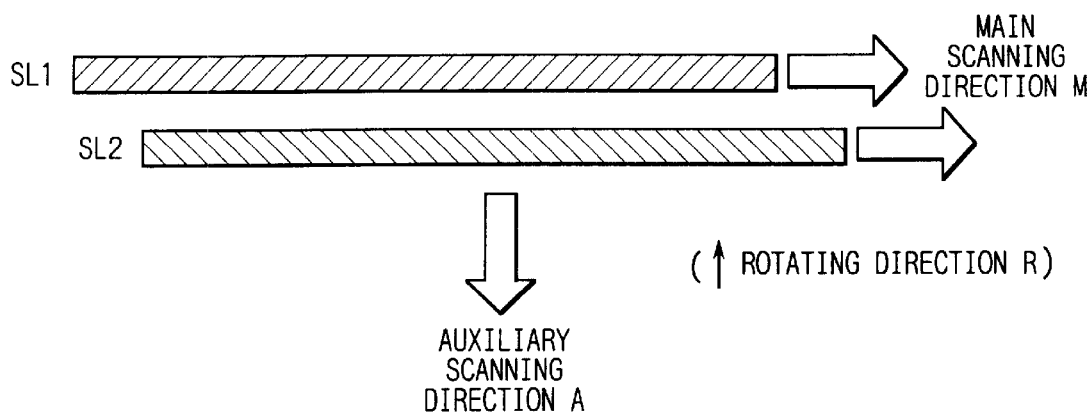
FIG. 5 is an explanatory diagram showing scanning lines SL1 and SL2 formed on the photosensitive drum by laser beams LB1 and LB2.

As shown in FIG. 5, the laser beam LB1, which has been modulated according to the first modulation signal and which has been emitted from the laser diode LD1, performs a main scan from left to right across the area indicated by the scanning line SL1. At the same time, the laser beam LB2, which has been modulated according to the second modulation signal and which has been emitted from the laser diode LD2. performs another main scan from left to right in the area indicated by the scanning line SL2. The two parallel scanning lines SL1 and SL2 are exposed on the photosensitive drum 77 simultaneously by the laser beams LB1 and LB2.

Figure 6:
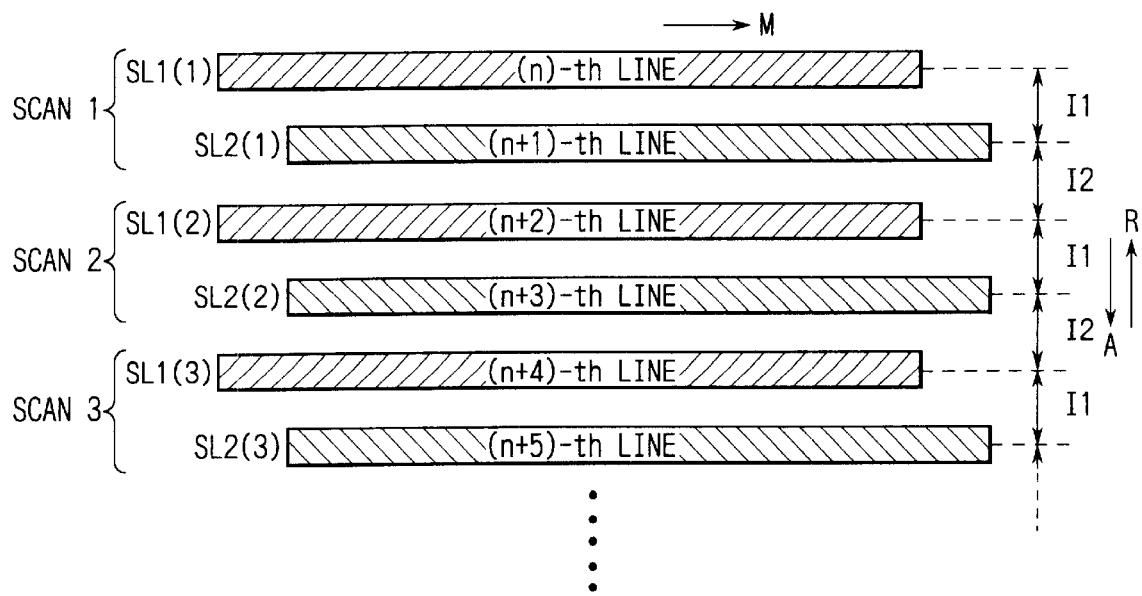
FIG. 6 is an explanatory diagram showing that, when high resolution is selected, successive series of main scanning lines are produced along the auxiliary scanning direction while the photosensitive drum rotates, each set of main scanning lines being formed simultaneously by the two laser beams.

The scanning lines SL1 and SL2 are separated from each other at a prescribed interval or distance I1 in the auxiliary scanning direction A as shown in FIG. 6. The amount of the interval I1 is fixed to a value that is determined by the factors including: the distance between the laser diodes LD1 and LD2: the length of the optical path along which the laser beams LB1 and LB2 travel from the laser diodes LD1 and LD2 to the photosensitive drum 77; and the focal lengths of the fθ lens 31, the collimator lens, and the cylindrical lens.

In the present embodiment, the start positions for exposing the scanning lines SL1 and SL2 are offset from each other. That is, the scanning lines SL2 begins at a position downstream, in the main scanning direction M, from the position where the scanning line SL1 begins. This positional relationship between the start positions for the scanning lines SL1 and SL2 is determined also according to the locations of the laser diodes LD1 and LD2.

It is noted that these start positions can be set the same as each other, or can be set with the scanning line SL1 starting at a downstream side from the scanning line SL2 along the main scanning direction M.

During the high resolution mode, the motor drive circuit 92 drives the photosensitive drum drive motor 78 to rotate the photosensitive drum 77 at the low rotational speed V. The LD1 control circuit 95 and the LD2 control circuit 96 are controlled to drive the laser diodes LD1 and LD2 to emit the laser beams LB1 and LB2 with the reference intensity.

As shown in FIG. 6, it is assumed that during a first scan, the image generating circuit 93 outputs a n-th line's worth of output image data as first output image data, and (n+1)-th line's worth of output image data as second output image data. The laser beams LB1 and LB2, which are respectively modulated according to the n-th and (n+1)-th lines worth of output image data, reflect off some reflecting surface of the rotating polygon mirror 23 to simultaneously scan the scanning lines SL1(1) and SL2(1) according to the process described above. The interval between the scanning lines SL1(1) and SL2(1) are fixed to the prescribed interval I1. During this first scan, the photosensitive drum 77 rotates in the rotating direction R (opposite to the auxiliary scanning direction A).

After completing the first scan for the scanning lines SL1(1) and SL2(1), the laser beams LB1 and LB2 start reflecting off the next reflecting surface of the rotating polygon mirror 23. After the laser beam LB1 projects onto the beam detector 49, the two laser beams LB1 and LB2 begin the next scan. The photosensitive drum 77 continues rotating in the rotating direction R, also from when the laser beams LB1 and LB2 complete the first scan until the laser beam LB1 projects onto the beam detector 49 and the laser beams LB1 and LB2 begin the next scan.

During the next scan (second scan), the image generating circuit 92 outputs (n+2)-th line's worth of output image data as first output image data, and outputs (n+3)-th line's worth of output image data as second output image data. The laser beam LB1 is modulated according to (n+2)-th line's worth of output image data and performs a main scan from the left end of the scanning line SL1(2). At the same time, the laser beam LB2 is modulated according to (n+3)-th line's worth of output image data and performs a main scan beginning from the left end of the scanning line SL2(2). The interval between the scanning lines SL1(2) and SL2(2) are fixed to the prescribed interval I1. The photosensitive drum 77 continues rotating still during the second scan.

Thus, the photosensitive drum 77 continues rotating in the rotating direction R. That is, the photosensitive drum 77 rotates in the rotating direction R while the laser beams LB perform scanning operation to form the scanning lines SL on the photosensitive drum 77. The photosensitive drum 77 rotates in the rotating direction R also after the laser beams LB complete a certain scan and before the laser beams LB begin the next scan.

Because the photosensitive drum 77 continues rotating from the beginning of the first scan until the completion of the second scan, the scanning line SL1(2) in the second scan will offset from the scanning line SL2(1) in the first scan at an interval I2. The low velocity V is set to such a value that the interval I2 will become equal to the prescribed interval I1. Thus, during the high resolution mode, the interval I2 becomes equal to the prescribed interval I1.

After completing the second scan, the laser beams LB1 and LB2 begin a third scan to expose scanning lines SL1(3) and SL2(3). During the third scan, the image generating circuit 93 outputs (n+4)-th line's worth of output image data as first output image data, and outputs (n+5)-th line's worth of output image data as second output image data. The laser beam LB1 is modulated according to (n+4)-th line's worth of output image data and performs a main scan from the left end of the scanning line SL1(3). The laser beam LB2 is modulated according to (n+5)-th line's worth of output image data and performs a main scan from the left end of the scanning line SL2(3). The interval between the scanning lines SL1(3) and SL2(3) is also fixed to the prescribed interval I1. Because the photosensitive drum 77 continues moving at the velocity V, the interval I2 between the scanning line SL1(3) and the scanning line SL2(2) has a value equal to the interval I1.

In this way, the main scans are repeatedly performed, based on successive sets of two adjacent line's worth of image data, to produce successive sets of two adjacent scanning lines SL1 and SL2. While the main scans are thus repeatedly conducted, the photosensitive drum 77 continues rotating in the rotating direction R. Accordingly, the successive sets of two scanning lines SL1 and SL2 are arranged on the photosensitive drum 77 along the auxiliary scanning direction A, opposite to the rotating direction R, thereby forming a latent image on the photosensitive drum 77. In each set of two scanning lines, the first scanning line SL1 is positioned in the upstream side (forwardmost side) along the auxiliary scanning direction A, while the second scanning line SL2 is positioned in the downstream side (rearmost side) along the auxiliary scanning direction A. The first scanning line SL1 in each set is positioned adjacent to and in the downstream side of the second scanning line SL2 in the preceding set. In other words, the second scanning line SL2 in each set is positioned adjacent to and in the upstream side of the first scanning line SL1 in the subsequent set.

The distance I1 between the first and second scanning lines SL1 and SL2 in each set is fixed to the prescribed value. The distance I2 between the first scanning line SL1 in each set and the second scanning line SL2 in the preceding set is determined dependently on the moving velocity of the photosensitive drum 77. Because the photosensitive drum 77 is rotating at the low velocity V during the high resolution mode, the distance I2 becomes equal to the distance I1, and therefore, the scanning lines in the successive scanning operations are arranged uniformly at the same interval I1. Thus, the photosensitive drum 77 is exposed and formed with a high dot-density latent image, in which uniformly-arranged successive series of dot lines are arranged with high dot-line density.

During the low resolution mode, in order to decrease the average dot density in the auxiliary scanning direction A, the photosensitive drum 77 is rotated in the high velocity V' that is higher than the low velocity V.

Figure 8:
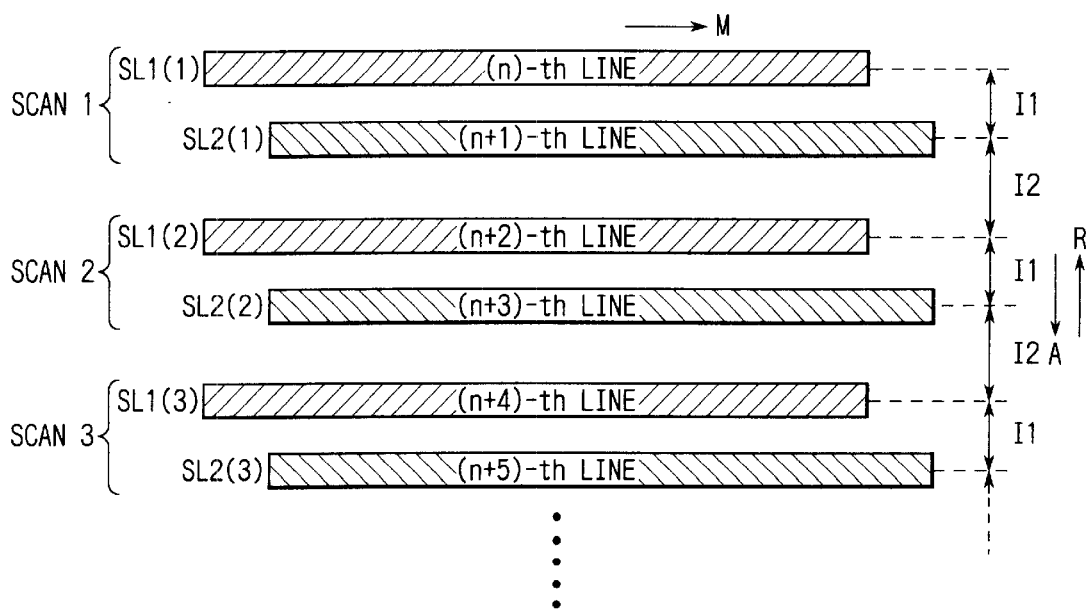
FIG. 8 is an explanatory diagram for a comparative example for low resolution scanning.

FIG. 8 shows a comparative example, for the low resolution mode, that the velocity of the photosensitive drum 77 is set to the high velocity V' and that the successive scanning is performed in the same manner as described above for the high resolution mode.

According to this comparative example, during the first scan, the first and second scanning lines SL1(1) and SL2(1) are scanned simultaneously by the laser beams LB1 and LB2 based on n-th and (n+3)-th lines worth of output image data. The scanning lines LS1(1) and SL2(1) are separated from each other by the prescribed interval I1. After completing the first scan, the second scan begins.

During the second scan, the first and second scanning lines SL1(2) and SL2(2) are scanned simultaneously by the laser beams LB1 and LB2 based on (n+2)-th and (n+3)-th lines worth of output image data. The scanning lines LS1(2) and SL2(2) are separated from each other by the prescribed interval I1. After completing the second scan, the third scan begins.

During the third scan, the first and second scanning lines SL1(3) and SL2(3) are scanned simultaneously by the laser beams LB1 and LB2 based on (n+4)-th and (n+5)-th lines worth of output image data. The scanning lines LS1(3) and SL2(3) are separated from each other by the prescribed interval I1. After completing the third scan, the fourth scan begins.

However, after each scan is completed and before the next scan begins, the auxiliary scan attained by the rotation of the photosensitive drum 77 exceeds the prescribed distance I1 because the auxiliary scanning velocity V' is greater than the velocity V. Accordingly, the interval I2, between the scanning line SL2 in each scan and the scanning line SL1 in the next scan, becomes wider than the interval I1. The wide interval I2 gives this portion of the image a lower image density (tone) than exposed portions for the narrower interval I1. Therefore, image density alternately changes, resulting in an natural image with an alternately-changed image density.

More specifically, the interval I1, between the first and second scanning lines SL1 and SL2 in each scan, is unrelated to the auxiliary scanning velocity and therefore is fixed to the same value as in the high resolution mode. However, the interval I2, between the second scanning line SL2 in each scan and the first scanning line SL1 in the next scan, is increased. Therefore, if the auxiliary scanning speed is simply increased from that used during the high resolution mode as in this comparative example, this will result in a non-unfirm interval between the successively-formed scanning lines SL. Hence, according to this comparative example, uneven intervals will be formed between the scanning lines SL. The area of the interval I1 has a denser image, while the portion of the interval I2 has a less dense image. As a result, nonuniformity in the tone of the entire image will become noticeable, thereby forming an unnatural image of inferior quality.

Figure 7:
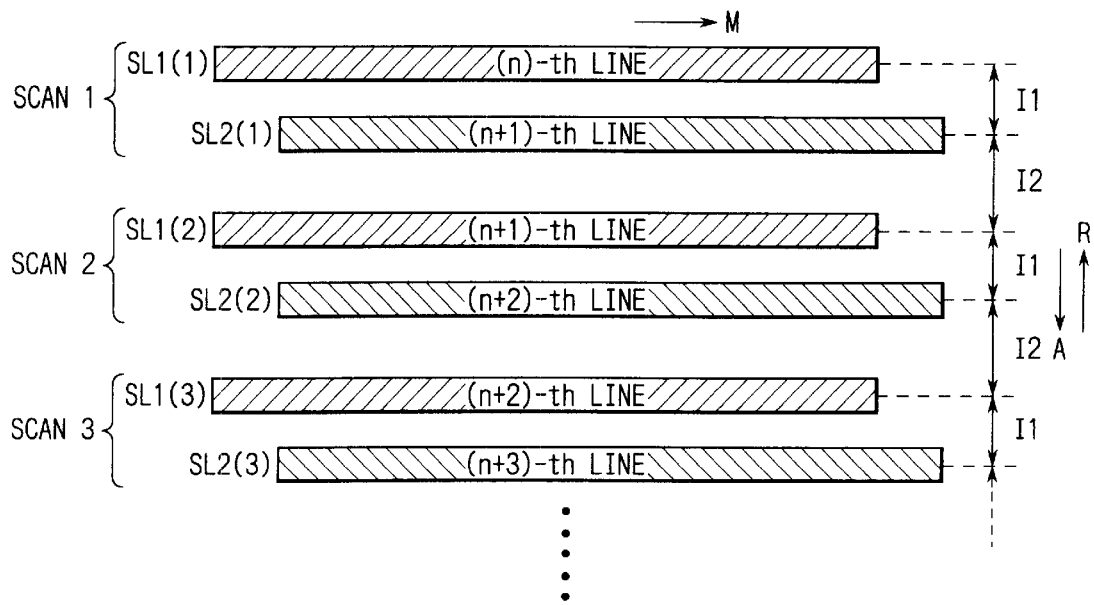
FIG. 7 is an explanatory diagram showing that, when low resolution is selected, successive series of main scanning lines are produced along the axillary scanning direction while the photosensitive drum rotates, each set of main scanning lines being formed simultaneously by the two laser beams.

To solve the problem, according to the present embodiment, successive scanning lines are produced in a manner as described below with reference to FIG. 7.

During the first scan, in the same manner as described above, the first and second scanning lines SL1(1) and SL2(1) are scanned simultaneously by the laser beams LB1 and LB2 based on n-th and (n+1)-th lines' worth of output image data. However, during the second scan, the first and second scanning lines SL1(2) and SL2(2) are scanned simultaneously by the laser beams LB1 and LB2 based on (n+1)-th and (n+2)-th lines' worth of output image data. During the third scan, the first and second scanning lines SL1(3) and SL2(3) are scanned simultaneously by the laser beams LB1 and LB2 based on (n+2)-th and (n+3)-th lines' worth of output image data.

Additionally, the LD1 control circuit 95 and the LD2 control circuit 96 are controlled to drive the laser diodes LD1 and LD2 to emit the laser beams LB1 and LB2 with an intensity greater than the reference intensity that is used during the high resolution mode.

Accordingly, during the low resolution mode, the scanning lines SL2(1) and SL1(2), that are exposed based on the same (n+1)-th line's worth of image data, are arranged on both sides of the interval I2, which is larger than the interval I1 between the scanning lines SL1 and SL2 in each scan. In this way, the space at the interval I2 will not appear noticeable. Additionally, by increasing the outputs or intensities of the laser beams LB1 and LB2, in comparison with those during the high resolution mode, the scanning lines SL2(1) and SL1(2) are made bolder to further prevent this space I2 from appearing noticeable.

Similarly, the scanning lines SL2(2) and SL1(3) that are exposed based on the same (n+2)-line's worth of output image data are arranged on both sides of the interval I2. In this way, the space at the interval I2 will not appear noticeable. Additionally, by increasing the outputs or intensities of the laser beams LB1 and LB2, the scanning lines SL2(2) and SL1(3) are made bolder to further prevent this space of interval I2 from appearing noticeable.

This method of exposure can minimize the amount of loss in image quality when printing at a low resolution, even for the multibeam scanner 12 which is incapable of changing the interval I1 between scanning lines SL1 and SL2 that are scanned simultaneously.

According to this method of exposure, the relationship between the high resolution D and the low resolution D' is selected so that the relationship between the auxiliary scanning speed V' and the auxiliary scanning speed V can allow the interval I2, attained during the low resolution mode, to have a value in a range greater than the value of interval I1 and smaller than the value determined by multiplying the value of interval I1 by two (2).

In other words, during the low resolution mode, the motor drive circuit 92 is controlled to perform auxiliary scans at the high speed V' so that the interval I2, between a previous group of two scanning lines SL and a next group of two scanning lines SL, will have a value greater than the interval I1, between simultaneously-scanned scanning lines SL, and smaller than two times as large as the interval I1. By setting the interval I2 within this range, it is possible to maintain an image quality, without noticeable irregularities in image density (tone), by simply adjusting the intensities of the laser beams LB.

As described already, the auxiliary scanning velocities V and V' have values related in the following manner:

$$V'=V\times(D/2D')$$

where D (dpi) is the resolution in the auxiliary scanning direction A for the high resolution mode, and D' is the resolution in the auxiliary scanning direction A for the low resolution.

When printing at a low resolution, according to the present embodiment, the downstream side scanning line SL2, in the auxiliary scanning direction A, of each group of scanning lines SL and the upstream side scanning line SL1, in the auxiliary scanning direction A, of a subsequent group of scanning lines SL are modulated according to the image data for the same line. By setting the resolution at 1,200 dpi for high resolution D and 400 dpi for low resolution D', for example, the ratio of resolution D to the resoltuionD' is 1,200/400=3. However, because the same data is used twice in low resolution printing according to the present embodiment, the auxiliary scanning velocity V' during low resolution printing has the following relationship with the auxiliary scanning velocity V during high resolution printing:

$$V'=V\times 3/2.$$

In other words, when the resolution D for high resolution printing is set at 1,200 dpi and the resolution D' for low resolution printing is set at 400 dpi, the resolution switching circuit 91 sets the velocity V' for the low resolution to a value 1.5 times as great as the conveying velocity V for the high resolution. Hence, the interval I2 shown in FIG. 7 becomes 1.5 times as large as the size of the interval I1.

When exposing at a low resolution D' in the present embodiment, the motor drive circuit 92 drives the photosensitive drum 77 in the auxiliary scanning direction A at a speed V' such that the interval I2, between each group of scanning lines SL and a next group of scanning lines SL, has a value between one and two times the size of an interval I1, between simultaneously-scanned scanning lines SL1 and SL2 in the same group. Stated differently, by setting the resolution D during high resolution printing at a value higher than twice and lower than four times the resolution D' during low resolution printing, then the interval I2 at low resolution can be set at a range within greater than one times and less than two times the interval I1. It is therefore possible to prevent a drop in image quality by simply correcting the light amount, thereby maintaining a good image quality without irregularity in the image density (tone). If the relationship between intervals I1 and I2 exceeds this range, however, then the spaces of interval I2 will become noticeable, even when regulating exposure.

Figure 4:
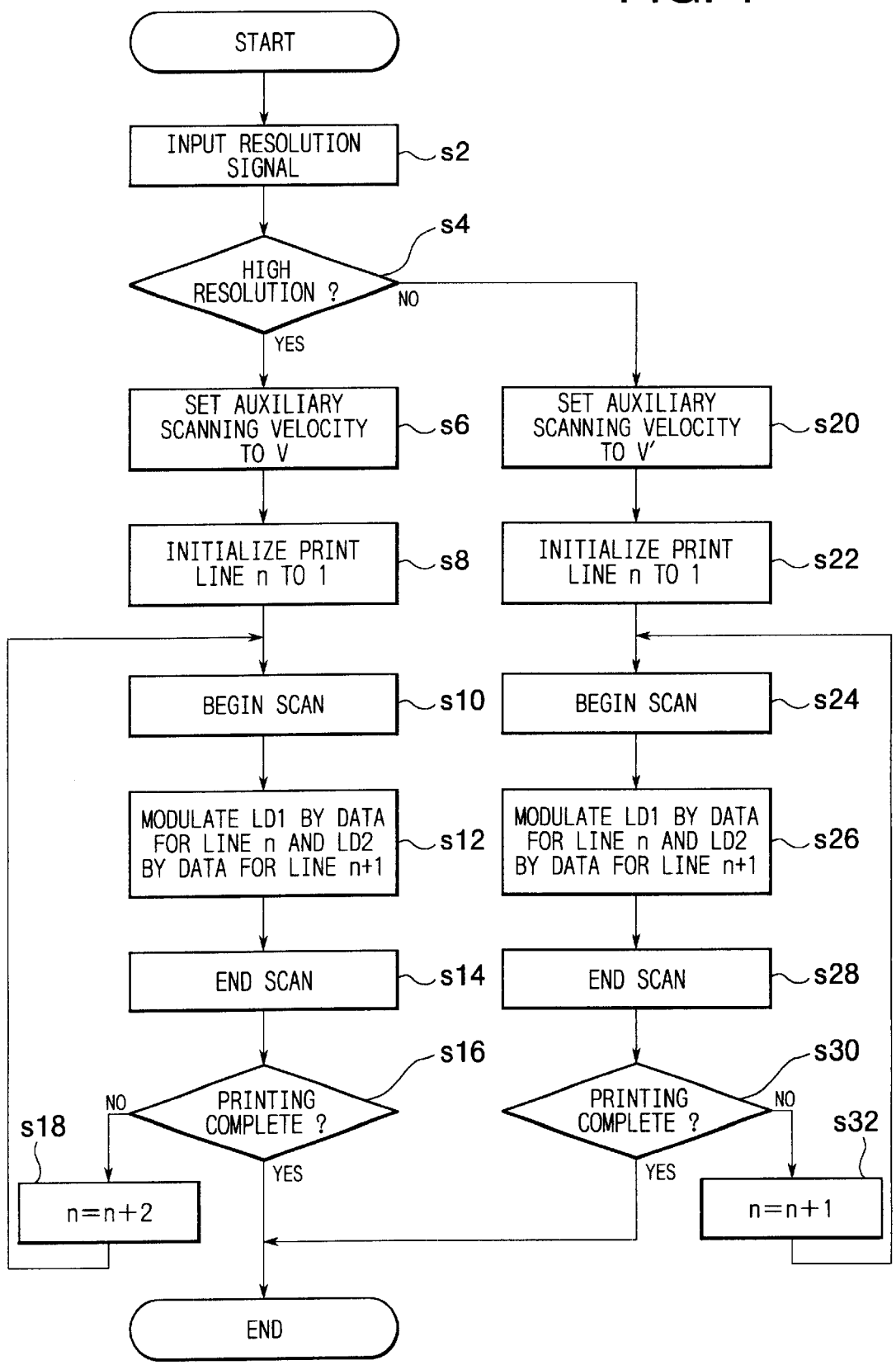
FIG. 4 is a flowchart showing a procedure for controlling the laser scanner.

The control process execute by the laser scanner 12 will be described below with reference to the flowchart of FIG. 4.

Control starts when power is turned ON. First, in Step 2 (hereinafter Step will be abbreviated as "S"), the CPU 101 of the control unit 9 performs initial settings. The CPU 101 also performs operating tests for each section in the laser printer 1 by executing a test program. A resolution selection signal is inputted to the input device 200 along with image data from the computer (not shown) connected to the laser printer 1. The CPU 101 analyses the inputted resolution selection signal, and supplies the resolution selection signal to the resolution switching circuit 91.

After supplying the resolution selection signal to the resolution switching circuit 91, the CPU 101 controls the resolution switching circuit 91, in S4, to determine whether the resolution selection signal indicates a high resolution or not. If the signal indicates a high resolution (Yes in S4), the program proceeds to S6.

In S6, the resolution switching circuit 91 sets the auxiliary scanning velocity to the low velocity V (m/s). The resolution switching circuit 91 issues a control signal, with its period corresponding to the set velocity V, to the motor drive circuit 92. The motor drive circuit 92 applies a pulse voltage, with its pulse number corresponding to the set velocity V, to the drive motor 78. As a result, the drive motor 78 is driven to rotate at a corresponding resolution speed, thereby attaining an auxiliary scanning speed V to achieve the interval I2 as equal to the interval I1 as shown in FIG. 6.

The resolution switching circuit 91 also issues the control signal to the image generating circuit 93 to control the image generating circuit 93 to develop the input image data into output image data of a dot matrix, where dots are arranged in a high average dot-density corresponding to the determined high resolution D. The resolution switching circuit 91 also sets the LD1 control circuit 95 and the LD2 control circuit 96 to emit laser beams LB1 and LB2 at the predetermined reference intensity.

Then, the program proceeds to S8, In S8, the CPU 101 initializes a print line number n to one (1) in order that the image generating circuit 93 will select a first line's worth of output image data to begin a print from the first line in the produced dot matrix.

In S10, the CPU 101 controls the LD1 control circuit 95 and the LD2 control circuit 96 to start emitting laser beams LB1 and LB2. At this time, the CPU 101 controls the modulation circuit 94 not to modulate the LD1 control circuit 95 or the LD2 control circuit 96. As a result, unmodulated laser beams LB1 and LB2 are irradiated onto the rotating polygon mirror 23, which in turn deflects the laser beams LB1 and LB2 toward the photosensitive drum 77 as shown in FIG. 2. When the beam detector 49 receives the laser beam LB1, the beam detector 49 issues a detection signal to the CPU 101, whereupon the CPU 101 determines to begin a main scan across the photosensitive drum 77, and the program proceeds to S12.

In S12, the CPU 101 controls the image generating circuit 93 to output a n-th line's worth of output image data as first output image data and to output a (n+1)-th line's worth of output image data as second output image data. The CPU

101 also controls the modulation circuit 94 to start modulating the LD1 control circuit 95 and the LD2 control circuit 96 according to the first and second output image data. As a result, the modulation circuit 94 modulates the laser diode LD1 according to the n-th line's worth of output image data. Because n is now equal to one (1), the modulation circuit 94 modulates the laser diode LD1 according to the first line's worth of output image data. The modulation circuit 94 also modulates the laser diode LD2 according to the (n+1)-th line's worth of output image data, that is, the second line's worth of output image data. Thus, the first main scan is attained.

When the first main scan finishes in S14, the program proceeds to S16, where the CPU 101 judges whether or not the printing is completed by searching for more print data (output image data). If more print data exits (No in S16), then the printing is not completed and (n) is incremented by two (2) into (n+2) in S18 in order to allow the image generating circuit 93 to output the next lines' worth of output image data to be printed.

The process then returns to S10 to begin the next scan. Since n has been incremented from 1 to 3 for the next scan, the laser diode LD1 is modulated according to data in the third line, while the laser diode LD2 is modulated according to data in the fourth line in S12. The second scan is thus performed.

After the second scan finishes in S14, it is once again judged in S16 whether or not the printing is completed. As long as data remains to be print (No in S16), the processes in S18 and S10–S14 are repeated, exposing the image little by little. When no more print data exists and the printing is completed (Yes in S16), the process ends.

On the other hand, if the resolution switching circuit 91 determines the input signal as not for a high resolution signal, but rather for a lower resolution (No in S4), then the program proceeds to S20. In S20, the resolution switching circuit 91 sets the axillary scanning velocity to the high velocity V'. The resolution switching circuit 91 then transmits, to the motor drive circuit 92, a control signal of a period that corresponds to the set velocity V'. The motor drive circuit 92 applies a pulse voltage of a corresponding pulse number to the drive motor 78, thereby driving the drive motor 78 to rotate. As a result, the drive motor 78 rotates the photosensitive drum 77 at a revolution speed attaining an auxiliary scanning speed V' to ensure that the interval I2 becomes greater than the interval I1 as shown in FIG. 7.

The resolution switching circuit 91 also issues the control signal to the image generating circuit 93 to control the image generating circuit 93 to develop the input image data into output image data of a dot matrix where dots are arranged in a low average dot-density corresponding to the determined low resolution D'. The resolution switching circuit 91 also sets the LD1 control circuit 95 and the LD2 control circuit 96 to emit laser beams LB1 and LB2 at an intensity greater than the predetermined reference intensity.

In S22, the CPU 101 initializes a print line number n to one (1) in order that the image generating circuit 93 will select a first line's worth of output image data to begin a print from the first line in the produced dot matrix.

Then, S24, the CPU 101 controls the LD1 control circuit 95 and the LD2 control circuit 96 to start emitting laser beams LB1 and LB2. At this time, the CPU 101 controls the modulation circuit 94 not to modulate the LD1 control circuit 95 or the LD2 control circuit 96. As a result, unmodulated laser beams LB1 and LB2 are irradiated onto the rotating polygon mirror 23, which in turn deflects the laser beams LB1 and LB2 toward the photosensitive drum 77. When the beam detector 49 receives the laser beam LB1, the beam detector 49 issues a detection signal to the CPU 101, whereupon the CPU 101 determines to begin a main scan across the photosensitive drum 77, and the program proceeds to S26.

In S26, the CPU 101 controls the image generating circuit 93 to output a n-th line's worth of output image data as first output image data and to output a (n+1)-th line's worth of output image data as second output image data. The CPU 101 also controls the modulation circuit 94 to start modulating the LD1 control circuit 95 and the LD2 control circuit 96 according to the first and second output image data. Accordingly, the modulation circuit 94 modulates the laser diode LD1 according to the n-th line's worth of output image data. Because n is now equal to one (1), the modulation circuit 94 modulates the laser diode LD1 according to the first line's worth of output image data. The modulation circuit 94 modulates the laser diode LD2 according to the (n+1)-th line's worth of output image data, that is, the second line's worth of output image data. Thus, the first main scan is attained. Because the LD1 control circuit 95 and the LD2 control circuit 96 are controlled to emit the laser beams LB1 and LB2 with the intensity greater than the reference intensity, the laser beams LB1 and LB2 can produce the scanning lines LS1 and LS2 with line thickness being greater than those formed during the high resolution mode.

When the first main scan finishes in S28, the program proceeds to S30, where the CPU 101 judges whether or not the printing is completed by searching for more print data. If more print date exists (No in S30), then the printing is not completed and (n) is incremented by one (1) into (n+1) in S32, in order to allow the image generating circuit 93 to perform, during the next scan, to read the same line's worth of data as that printed by the laser beam LB2 in the present scan and to output the read data as first output image data for the laser beam LB1.

The process then returns to S24 to begin the next scan. Since n has been incremented from 1 to 2 for the next scan, the laser diode LD1 is modulated according to data in the second line, while the laser diode LD2 is modulated according to data in the third line in S26. The second scan is thus performed.

After the second scan finishes in S28, it is once again judged in S30 whether or not the printing is completed. As long as data remains to be printed (No in S30), the processes in S32 and S24–S28 are repeated, exposing the image little by little. When no more print data exists and the printing is completed (Yes in S30), the process ends.

As described above, in the multibeam scanner 12 of the present embodiment, the resolution switching circuit 91 of the control unit 9 transmits a control signal to the motor drive circuit 92 and controls the motor drive circuit 92 to rotate the drive motor 78 at a velocity corresponding to the resolution. The resolution switching circuit 91 transmits a resolution signal to the image generation circuit 93 and controls the image generating circuit 93 to generate output image data that conforms to the resolution. The LD1 control circuit 95 and the LD2 control circuit 96 are modulated by the modulation circuit 94 to oscillate the laser diodes LD1 and LD2 based on the output image data. When performing exposure at a low resolution, the rearmost scanning line SL2 in the previous group of lines and the forwardmost scanning line SL1 in the following group of scanning lines are exposed according to the same image signal, thereby preventing a loss of image quality by preventing open areas of the interval I2 between scanning lines from becoming noticeable.

Thus, according to the present embodiment, during the low resolution mode, the motor drive circuit 92 controls the movement in the auxiliary scanning direction A at the higher velocity V' to achieve the interval I2 greater than the interval I1. Further, the laser beams LB1 and LB2 are modulated so that the rearmost scanning line SL2 in the previous scanning lines SL and the forwardmost scanning line SL1 in the following scanning lines SL are exposed according to the same image signal. Accordingly, it is possible to use the increased auxiliary scanning velocity V' to improve the printing speed. Even when the intervals between the successive scanning lines SL are not uniform but alternately change between I1 and I2, the wider intervals I2 are not noticeable because they are sandwiched by scanning lines modulated accordingly to the same image signal. Hence, it is possible to minimize a decline in image quality.

Additionally, according to the present embodiment, based on the selected resolution, the resolution switching circuit 91 varies the auxiliary scanning velocity between the values V and V' in relation to the main scanning velocity that is maintained fixed by rotating the polygon mirror 23 at the fixed rotational speed. Accordingly, it is possible to freely change the amount of the interval I2 between previous and following groups of lines, while maintaining a stable main scan. As a result, it is possible to increase the printing speed without losing image quality, while stabilizing the velocity of the main scan.

In particular, during the low resolution mode, the light amounts of the laser beams LB1 and LB2 are increased relative to those during the high resolution mode. Accordingly, it is possible to increase the light amounts of the laser beams LB2 that exposes the rearmost scanning lines SL2 in the previous group of scanning lines and the exposure amounts of the laser beam LB1 that exposes the forwardmost scanning line SL1 in the following group of scanning lines, in comparison with the light amounts used during a high resolution. Hence, even if the interval I2 between the rearmost scanning line SL2 in the previous group of scanning lines and the forwardmost scanning line SL1 in the following group of scanning lines increases, it is possible to prevent reduction of the image density (tone). It is possible to prevent any loss of image quality.

It is noted that the light amounts of the laser beams LB1 and LB2, during the low resolution, may be increased from those, during the high resolution, in correspondence with the relationship between the interval I2 relative to the interval I1. For example, the light amounts of the laser beams LB1 and LB2, during the low resolution, may be increased from those, during the high resolution, in proportion to the ratio of the amount of the interval I2 relative to the interval I1. In other words, assuming that the light amounts of the laser beams LB are set to a reference value L during the high resolution, the light amounts may be increased, during the low resolution, to a value of $L'=L\times(I2/I1)=L\times(V'/V)$. In other words, the LD1 control circuit 95 and LD2 control circuit 96 can increase the light amounts of the laser beams based on the amount of the distance I2, between the previous and following groups of scanning lines SL, at the low resolution mode. Accordingly, it is possible to regulate the image density (tone) even when the interval I2 widely increases. It is therefore possible to achieve a good image quality by regulating the exposure amount dependently on the degree of drop.

While the invention has been described in detail with reference to the specific embodiment thereof, it would be apparent to those skilled in the art that many modifications and variations may be made therein without departing from the spirit of the invention, the scope of which is defined by the attached claims.

For example, the number of laser diodes LD in the configuration can be increased to three or four or more. In these cases, during the low resolution mode, the rearmost scanning line SLm (where m is the total number of laser diodes) in the previous group of scanning lines SL and the forwardmost scanning line SL1 in the following group of scanning lines SL are exposed according to the same image signal.

In the above description, the light amount of the laser beams is adjusted in proportional to the interval I2. However, it may be possible to regulate the light amounts in other manners to produce a natural print finish.

In the above-described embodiment, the laser diodes LD are employed as light sources emitting light beams LB. However, the light source is not emitted to a laser diode, but can be any light source that is capable of scanning and emitting a light beam.

Further, the device for deflecting the light beam is not limited to the polygon mirror, but can be a galvanometer, hologram disk or the like.

The optical system for focusing the modulated light onto the photosensitive medium is not limited to the construction described above that includes the collimator lens, the cylindrical lens, and the fθ lens 31.

The photosensitive body 77 is not limited to the cylindrical drum type, but can also be a flat type.

Further, the multibeam scanner of the present embodiment and modifications can be applied to many apparatuses other than the laser printer.

What is claimed is:

1. A multibeam scanning device, comprising:

a resolution setting unit setting at least a first resolution;

a photosensitive medium moving unit moving a photosensitive medium in a predetermined moving direction, the photosensitive medium moving unit moving the photosensitive medium in the predetermined moving direction at a first velocity that corresponds to the first resolution, an auxiliary scanning direction being defined as a direction opposite to the predetermined moving direction;

a light beam unit that emits a plurality of light beams;

a light beam modulation unit that modulates the plurality of light beams dependently on image signals; and a beam deflecting unit deflecting the plurality of modulated light beams to simultaneously scan the plurality of light beams on a corresponding plurality of scanning lines that extend along a predetermined main scanning direction on the photosensitive medium, while the photosensitive medium moves in the predetermined moving direction, thereby exposing a corresponding image on the photosensitive medium, the main scanning direction being substantially orthogonal to the moving direction, the plurality of scanning lines being arranged adjacent to one another and being separated from one another by a first interval in the auxiliary scanning direction, the beam deflecting unit deflecting the plurality of light beams in the main scanning direction repeatedly to form a successive sets of plural scanning lines while the photosensitive medium moving unit moves the photosensitive medium in the predetermined moving direction, thereby forming the successive sets of scanning lines to be arranged and to be separated from one another by a second interval in the auxiliary scanning direction, the second interval having a value corresponding to the first velocity and greater than a value of the first interval, the plurality of light beams including a first light beam that forms, in each set, a first scanning line that is located adjacent to a scanning line in a preceding set of scanning lines, and a second light beam that forms, in each set, a second scanning line that is located adjacent to a scanning line in a subsequent set of scanning lines, the light beam modulation unit modulating, for the first resolution, the second light beam, that forms the second scanning line of each set, and the first light beam, that forms the first scanning line of another set next to the each set, based on the same image signal.

2. A multibeam scanning device as claimed in claim 1, wherein the value of the second interval is in a range greater than the value of the first interval and smaller than a value second times as large as the value of the first interval.

3. A multibeam scanning device as claimed in claim 1,
   wherein the beam deflecting unit deflects the plurality of modulated light beams to simultaneously scan the plurality of light beams at a predetermined main scan velocity along the predetermined main scanning direction on the photosensitive medium,
   wherein the resolution setting unit is capable of changing a resolution from the first resolution to another resolution, and
   wherein the photosensitive medium moving unit changes, in response to change of the resolution, the moving velocity of the photosensitive medium in the predetermined moving direction from the first velocity into another velocity, thereby changing the value of the second interval according to the set resolution.

4. A multibeam scanning device as claimed in claim 3, wherein the resolution setting unit is capable of setting a second resolution that is greater than the first resolution, and
   wherein the photosensitive medium moving unit moves the photosensitive medium by a second velocity in the predetermined moving direction, the second velocity being smaller than the first velocity and allowing the value of the second interval to become equal to the first interval.

5. A multibeam scanning device as claimed in claim 4,
   wherein the first resolution has a value of D and the second resolution has a value of D' which is greater than the value of D, the first velocity V' and the second velocity V satisfying the following equation:

$$V'=V \times (D/2D').$$

6. A multibeam scanning device as claimed in claim 4, further comprising a light amount control unit that controls, when the resolution setting unit sets the first resolution, the light beam unit to set the light amounts of the first and second light beams to a first value, the light amount control unit controlling, when the resolution setting unit sets the second resolution, the light beam unit to set the light amounts of the first and second light beams to a second value, the first value being greater than the second value.

7. A multibeam scanning device as claimed in claim 6,
   wherein a relationship between the first and second values of the light amounts corresponds to a relationship between the value of the second interval set for the first resolution and the value of the first interval.

* * * * *

UNITED STATES PATENT AND TRADEMARK OFFICE
CERTIFICATE OF CORRECTION

PATENT NO. : 6,504,147 B1  Page 1 of 1
DATED : January 7, 2003
INVENTOR(S) : Koji Ito et al.

It is certified that error appears in the above-identified patent and that said Letters Patent is hereby corrected as shown below:

Column 20,
Line 53, please delete "a" before "successive sets of plural scanning lines".

Signed and Sealed this

Twenty-fifth Day of March, 2003

JAMES E. ROGAN
*Director of the United States Patent and Trademark Office*